Oct. 11, 1960     R. V. COLES     2,955,466
TEST PROBE

Filed Dec. 1, 1955     2 Sheets-Sheet 1

Oct. 11, 1960  R. V. COLES  2,955,466
TEST PROBE

Filed Dec. 1, 1955  2 Sheets-Sheet 2

INVENTOR.
RALPH V. COLES.
BY
HIS ATTORNEY.

United States Patent Office 2,955,466
Patented Oct. 11, 1960

2,955,466

TEST PROBE

Ralph Vernon Coles, Radnor, Pa., assignor to Robertshaw-Fulton Controls Company, Richmond, Va., a corporation of Delaware Filed Dec. 1, 1955, Ser. No. 550,297

5 Claims. (Cl. 73—290)

This invention relates to a capacity type indicating and/or controlling apparatus and more particularly to test probes for measuring and/or controlling the quantity or level of large and small granular material in a bin or container.

In devices of this general character, it has been customary to utilize a test probe comprising an insulated rigid metallic rod as one plate of a capacitor which would effectively vary the impedance of an oscillator circuit for indicating and controlling the level of material in the container. These rods were, however, subject to severe damage or to being bent out of shape by the lateral pressures exerted thereon caused by the shifting of the material in the container as in the case of granular material such as grains, sand, salts or the like. This material, which usually flows into the container from above will seek its level of repose peculiar to the type of material and quite often will exert tremendous horizontal pressures upon the sides of the container. Level indicator probes, which are usually located adjacent one side of the bin, are often swept by the flowing tide of material, thus severely damaging the probe itself and rendering the same incapable of performing its function.

In similar fashion, the fall of huge lumps of material such as iron ore, coal and the like have made the process of indicating the level thereof virtually impossible since, as often the case, the movement of a single lump of material was sufficient to snap the usual probe off its mount or bend the same beyond usefulness. In addition, the upwardly moving lumps would engage the end portion of the test probe carrying the same therewith thereby bending and twisting the probe completely out of shape.

The preferred embodiment of the invention takes the form of a capacity level mechanism having a flexible conductor which comprises a plurality of strands of wire interwoven or braided to effect maximum flexibility. The conductor so formed is encased in a flexible insulating container for preventing electrical contact between the conductor and the material to be measured. A novel fastener is provided for mounting the conductor and insulator in the material container or bin to effect the maximum vertical pull which may be exerted upon the conductor during the filling stages of the container. It will therefore be apparent that the principal object of the invention is to insure proper indication or controlling of the level indicating apparatus regardless of the type of material under test.

Another object of the invention is to utilize a test probe which will flex under the lateral pressure exerted by the material flowing into the bin.

Other objects and advantages will appear from the following specification taken in conjunction with the accompanying drawings wherein.

Figure 1:
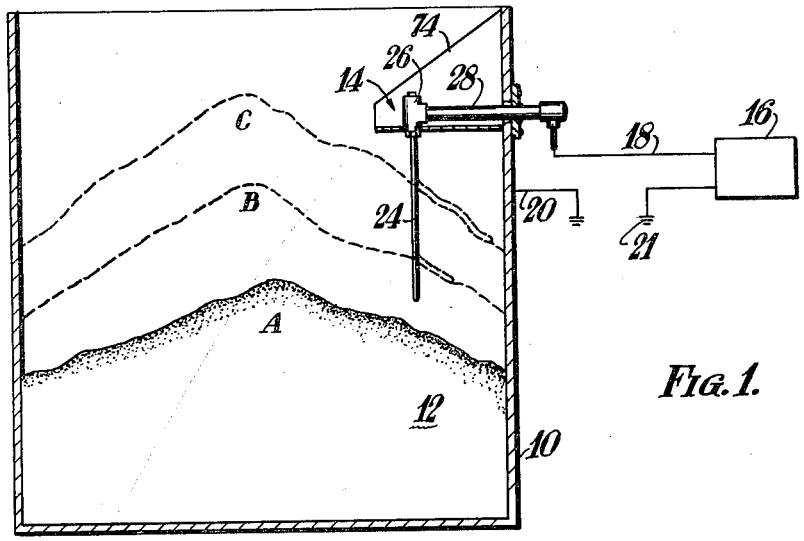
Fig. 1 is a schematic view of a typical application of the present invention.

Referring more particularly to Fig. 1, there is shown a bin or container 10 which is adapted to hold or store the material 12 the level of which is to be controlled. A capacity test probe generally indicated by the reference numeral 14 is mounted in the tank 10 and is electrically connected to a capacity type level control device 16 by a conductor 18 from the probe 14 and a conductor 20 connected from the tank 10 to ground. The control device 16 is grounded at 21 and thus completes the circuit to the probe 14.

The present invention contemplates the controlling of the level of the material 12 by utilizing the principle of direct proportion between the height of the material in a container and the capacity between one plate of a capacitor insterted in the material and the side of the container. The capacity change will then be controlled in terms of height.

The capacity control device 16 may be of any suitable type which includes a capacity sensitive oscillator circuit for energizing a relay actuated valve thereby controlling the level of the material 12 by the change of capacitance between the test probe 14 and the side of the bin 10 caused by the raising and lowering of the level of the material 12 therebetween. Since these capacity level controllers are quite well known in the art, further details of the same will be unnecessary.

Figure 2:
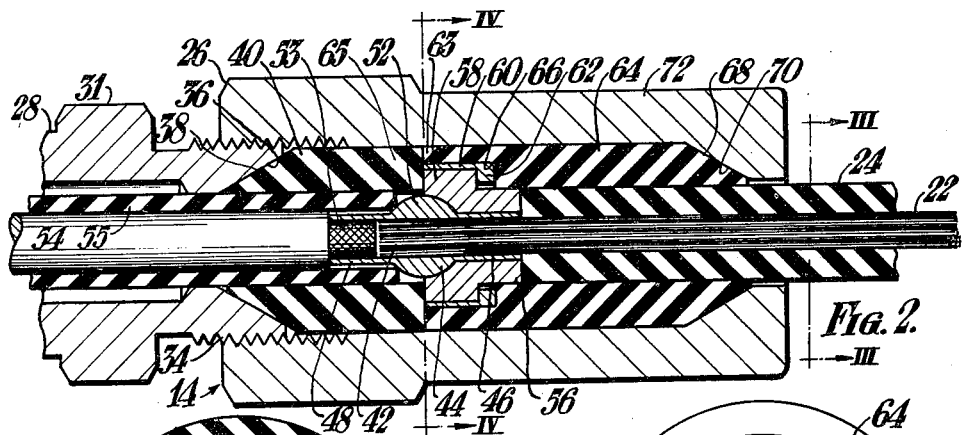
Fig. 2 is a partial sectional view, showing a preferred mounting structure.
Figures 3, 4:
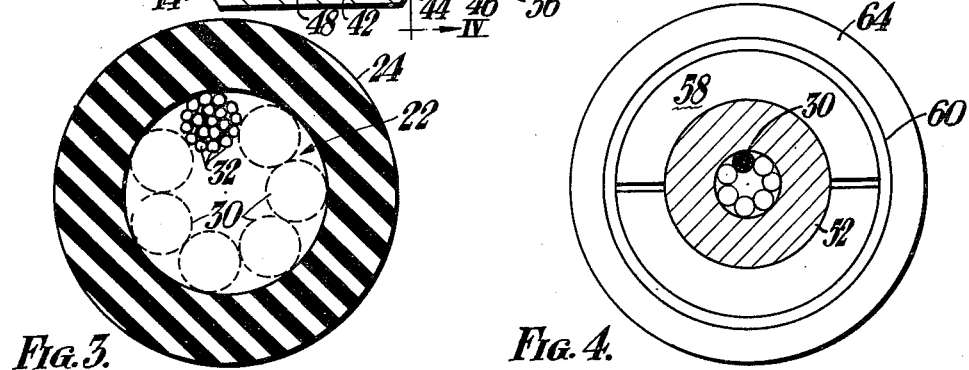
Fig. 3 is an enlarged sectional view taken along lines III—III of Fig. 2.
Fig. 4 is an enlarged sectional view with portions removed taken along lines IV—IV of Fig. 2.

As shown in Figs. 2 to 4, the test probe 14 comprises a relatively long flexible double-layered wire rope 22 completely encased in an insulating casing 24 and a cylindrical clamp 26 adapted for mounting the flexible rope 22 to a mounting bracket in tthe form of a conduit 28 secured to the side of the bin 10. The wire rope 22 is preferably double-layered for preventing the slipping of the insulating casing 24 upon the rope 22 in the event of axial stresses exerted upon the same by the material 12. The wire rope 22 is formed of a plurality of strands 30, in this case seven, each of which consists of a plurality, in this instance nineteen wires indicated at 32. The wires 32 may be of any suitable conducting material and are braided in the usual manner to form the strands 30 which in turn are braided to form the rope conductor 22. It is to be understood that any convenient number of strands and wires within a single strand may be employed without departing from the scope of the invention. The use of at least seven strands is preferable because the flexibility of the wire rope is proportional to the number of strands.

The mounting bracket or conduit 28 includes a pipe fitting 31 having one end externally threaded at 34 and internally beveled at 36 to receive an externally beveled end 38 of a compression sleeve 40. As shown in Fig. 2, one end 42 of the wire rope 22 projects beyond the end of the insulation 24 and is adapted to be encased by a metallic connector 44 which comprises a pair of open-ended cylinders 46, 48, and a ball-shaped flange 52 formed therebetween. During the assembly of the parts so far described, when the end 42 has been inserted in the cylinder 46 and the ball flange 52, the cylinder 46 and the flange 52 are swaged by cold working to the end 42 of the wire rope 22 so as to intimately mate the metals comprising the same. The other cylinder 48 is likewise cold worked to the adjacent knurled end 53 of a conductor bar 54 disposed within the conduit 28 and which is secured to the lead wire 18. It will be appreciated that by having the conductor bar 54 and the wire rope 22 intimately connected to a common element in this manner, the tensile strength at the juncture of the bar 54 and the rope 22 is as great as the tensile strength of either the bar 54 or the rope 22.

Concentric with the bar 54, the wire rope 22 and the connector 44 is a metallic receptacle 56 which is in the form of a split sleeve and so dimensioned as to telescope over the outer end of the cylinder 46. The interior surface of one end 58 of the receptacle 56 is cup-shaped to conform with the outer configuration of the spherical flange 52 for a purpose which will presently appear. A metallic sleeve 60 is telescoped over the receptacle 56 and is provided with a flange 62 for abutting the end 58 of the receptacle 56. A gland 64 is fitted over the end of the insulation 24 adjacent the end 42 of the rope conductor 22 and has a portion 66 which is so internally dimensioned as to conform to the outer configuration of the sleeve 60 and the flange 62. One end 63 of the gland 64 is adapted to abut the end 65 of the compression sleeve 40 remote from the beveled end 38 for a purpose which will presently appear. The other end of the gland 64 is externally beveled at 68 to conform to an internal bevel 70 of a gland nut 72, threadedly received on the threaded end 34 of the fitting 31.

The nut 72 encompasses the gland 64 and the compression sleeve 40 and when turned down upon the fitting 31, the beveled portion 70 of the nut 72 will slide along the beveled end 68 of the gland 64 to compress the same radially upon the adjacent portion of the insulation 24 and to force the gland 64 to the left as viewed in Fig. 2 to move the beveled end 38 of the compression sleeve 40 against the beveled surface 36 of the fitting 31. This movement of the gland 64 carries the flange 62 of the sleeve 60 therewith for forcing the receptacle 56 against the end 65 of the sleeve 40. Simultaneously, the movement of the end 38 of the sleeve 40 along the surface 36 of the fitting 31, compresses the sleeve 40 upon the insulation 55 of the bar 54. In this manner, the elements 40, 52, 58, 60 and 64 are firmly locked in an extremely compressed condition for preventing axial displacement of the wire conductor 22 and the insulation 24 from the bracket 28. It is to be understood that the insulators 24 and 55, the compression sleeve 40 and the gland 64 may be made of any suitable material which will electrically insulate the bar 54 and the conductor 22 from the surrounding metallic structure. It is also desired that the insulating material be somewhat pliable for permitting the rigid clamping of the bar 54 and the conductor 22. It has been found that the most effective material for these purposes is Teflon or polyvinyl chloride, but it is to be understood that any similar material may be used without departing from the scope of the invention.

As shown in Fig. 1, a shield 74 of semiconical shape is mounted interiorly of the wall of the bin 10 and is juxtaposed with respect to the probe 14 and the bracket 28. The shield 74 serves to deflect any falling material which may stray during the normal filling stages of the bin 10 and thereby protect the bracket 28 from damage caused by direct impingement of the material.

In operation, assuming that relatively large granular material is being conveyed into the bin and that the level of the material 12 is initially at the position A, the controller 16 will control the level in accordance with the capacity between the probe 14 and the bin 10. As the material 12 rises, say, to the position indicated at B, the wire rope 22 and the insulator 24 will flex and conform to the contours of the adjacent portion of the material without seriously affecting the proper indication of the level. As the level of the material rises higher, the wire rope 22 will be carried along with the surface of the material, as shown by the level of the material at C. It will be apparent that any large piece of material which may slide or fall against the rope 22 will merely flex the same without damaging the structure thereof.

Figure 5:
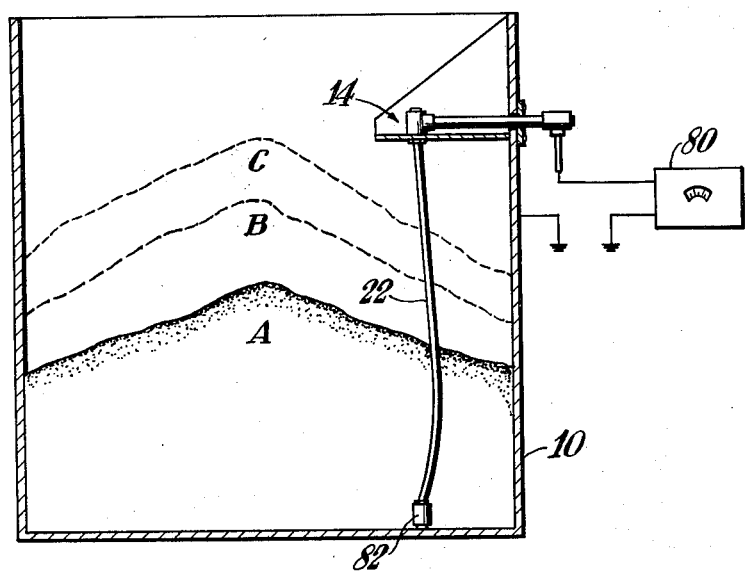
Fig. 5 is a schematic view, similar to Fig. 1, but showing another application of the present invention.

In the embodiment of Fig. 5, the present invention takes the form of an indicating means and is substantially the same as that shown in Fig. 1 except that the wire rope 22 is anchored to the bottom of the tank 10, and an indicator 80 replaces the controller apparatus 16. The end of the rope 22 is fastened to the bottom of the tank 10 by a clamp 82 which is similar to that shown in Fig. 2. As shown in Fig. 5, the flexible wire rope 22 is adapted to flex somewhat when the material 12 shifts laterally during filling of the container 10. In this manner, breaking or bending of the probe is prevented without sacrificing accurate indication of the level of the material 12 by the indicator 80.

From the foregoing, it will be apparent that the present invention is adapted for indicating, controlling and recording the level of material in a container regardless of the type of material to be measured and a mounting means is provided for preventing displacement of the probe from its support. It will also be obvious to those skilled in the art that the illustrated embodiment may be variously changed and modified, or features thereof, singly or collectively embodied in other combinations than those illustrated without departing from the scope of the invention or sacrificing all of the advantages thereof, and that accordingly the disclosure herein is illustrative only and the invention is not limited thereto.

I claim:

1. In a system for determining the level of a granular material within a container, wherein the container is connected to form a capacitance plate, the combination comprising, an elongated flexible test probe disposed within the container in a vertical position, said test probe having a length less than the depth of the container, and means connected to said container and the upper end of said test probe whereby the lower end of said test probe hangs freely and is adapted to overlie the surface of granular material disposed within the container, said means being operable to interconnect the container and the test probe whereby the test probe forms a second capacitance plate which is cooperable with the container for determining the level of granular material therein.

2. The system of claim 1 wherein the test probe comprises a plurality of braided strands, said strands being formed from a plurality of braided relatively thin wires, and insulation material surrounding said strands for insulating the same from the granular material.

3. In a system for determining the level of a granular material within a container wherein the container is connected to form a capacitance plate, the combination comprising, an elongated flexible test probe having a length less than the depth of the container and being disposed within the container, mounting means connected to the container and to one end of said test probe whereby the other end of said test probe hangs from said mounting means and is adapted to override the surface of granular material disposed within the container, and means disposed within said mounting means and being connected to said test probe whereby said test probe forms a second capacitance plate which is cooperable with said container for determining the level of the granular material within the container.

4. A quantity level probe comprising an elongated flexible member having an outer tubular casing of insulating material, an inner core in said tubular casing having a plurality of strands braided together, each of said strands being composed of a plurality of wires braided together, said inner core projecting beyond one end of said outer casing, a conductor abutting said projecting end of said inner core, an insulating sleeve for said conductor, a connector sleeve fixed to said conductor and said inner core and forming an electrical connection therebetween, said sleeve having an enlarged outer portion intermediate the ends thereof bearing on one side thereof upon said insulating sleeve, a compression sleeve extending over one end of said connector sleeve and having a seating surface bearing upon the opposite side of said enlarged portion, a pair of oppositely disposed tubular insulating means enclosing said connector sleeve and said compression sleeve and having oppositely disposed tapered ends, a coupling element having a tapered bore for operative engagement with one of said tapered ends, and a second coupling element carried by said insulating means and operatively engageable with the first said coupling element and the other said tapered end for exerting a thrust on said tapered ends for compressing said insulating means therebetween to hold said conductor and said inner core within said coupling elements and maintained against separation by said enlarged portion.

5. A quantity level probe as claimed in claim 4, wherein said compression sleeve is formed of a pair of complemental parts adapted to be moved toward each other under said thrust exerted by said first and second coupling elements.

References Cited in the file of this patent

UNITED STATES PATENTS

| | | |
|---|---|---|
| 457,865 | Manson | Aug. 18, 1891 |
| 1,494,954 | Crouch | May 20, 1924 |
| 2,318,822 | Wantz | May 11, 1943 |
| 2,497,568 | Thacker | Feb. 14, 1950 |
| 2,526,277 | Rogoff | Oct. 17, 1950 |
| 2,529,015 | Levkovitsch | Nov. 7, 1950 |
| 2,615,953 | Waite | Oct. 28, 1952 |
| 2,677,964 | Engelder | May 11, 1954 |
| 2,711,520 | Kernen et al. | June 21, 1955 |

FOREIGN PATENTS

| | | |
|---|---|---|
| 938,646 | France | Apr. 12, 1948 |